(12) United States Patent
Fink

(10) Patent No.: US 7,040,032 B2
(45) Date of Patent: May 9, 2006

(54) METHOD AND DEVICE FOR MEASURING WHETHER A PROCESS KIT PART MEETS A PRESCRIBED TOLERANCE

(75) Inventor: Steven T. Fink, Mesa, AZ (US)

(73) Assignee: Tokyo Electron Limited, Tokyo (JP)

( * ) Notice: Subject to any disclaimer, the term of this patent is extended or adjusted under 35 U.S.C. 154(b) by 1 day.

(21) Appl. No.: 10/806,400

(22) Filed: Mar. 23, 2004

(65) Prior Publication Data

US 2005/0211004 A1    Sep. 29, 2005

(51) Int. Cl.
  *G01B 3/50* (2006.01)
  *G01B 3/00* (2006.01)
(52) U.S. Cl. ............... 33/501.45; 33/501.05; 33/567; 73/865.9
(58) Field of Classification Search ............ 33/501.45, 33/501.05, 501.06, 501.08, 501.09, 562, 33/567; 73/865.8, 865.9
See application file for complete search history.

(56) References Cited

U.S. PATENT DOCUMENTS

| | | | | |
|---|---|---|---|---|
| 1,626,176 A | * | 4/1927 | Atwood | ............... 33/501.45 |
| 2,229,124 A | * | 1/1941 | Phillips | ..................... 33/542 |
| 2,514,956 A | * | 7/1950 | Kuebler | ................. 33/501.45 |
| 4,151,652 A | * | 5/1979 | Palma | ..................... 33/679.1 |
| 4,200,987 A | * | 5/1980 | Schmitt | ..................... 33/501.4 |
| 4,858,330 A | * | 8/1989 | Larsen | .................. 33/501.45 |
| 5,131,158 A | * | 7/1992 | Wong | ..................... 33/501.45 |
| 5,446,774 A | * | 8/1995 | Russell et al. | ............... 33/533 |
| 5,471,757 A | * | 12/1995 | McDonald | ............. 33/501.45 |
| 5,516,402 A | * | 5/1996 | Sarrine et al. | ............. 204/461 |
| 5,875,558 A | * | 3/1999 | Bakke et al. | ............. 33/501.45 |
| 6,637,121 B1 | * | 10/2003 | Barefoot | ................ 33/501.45 |
| 6,748,667 B1 | * | 6/2004 | Sevastian | ................ 33/501.45 |
| 6,904,690 B1 | * | 6/2005 | Bakke et al. | ............. 33/501.45 |
| 2004/0045180 A1 | * | 3/2004 | Barefoot | ................ 33/501.45 |
| 2005/0287927 A1 | * | 12/2005 | Berman et al. | ................ 451/5 |

* cited by examiner

*Primary Examiner*—Yaritza Guadalupe
(74) *Attorney, Agent, or Firm*—Oblon, Spivak, McClelland, Maier & Neustadt, P.C.

(57) ABSTRACT

A go no-go gauge and method for verifying whether a process kit part used within a plasma chamber of a plasma processing tool has accumulated excessive wear or deposits. The gauge includes a component for verifying whether a dimension of a process kit part feature violates a prescribed size tolerance, the violation indicating that the process kit part has accumulated excessive wear or deposits.

25 Claims, 10 Drawing Sheets

METHOD AND DEVICE FOR MEASURING WHETHER A PROCESS KIT PART MEETS A PRESCRIBED TOLERANCE

BACKGROUND OF THE INVENTION

1. Field of the Invention

The present invention relates generally to measuring a process kit part, and more particularly to a system for monitoring the accumulation of deposits and wear on plasma process kit parts.

2. Discussion of the Background

The semiconductor industry employs plasma processing tools to etch and deposit materials on the substrates for integrated circuit (IC) devices. Plasma can be formed in numerous sources, including a capacitively coupled plasma (CCP) source, an inductively coupled plasma (ICP) source, an electrostatic radio frequency (ESRF) source, or any combination thereof.

Regardless of the source, plasma is typically formed by ionizing a process gas with high energy electrons, in a plasma chamber housing an IC substrate. Depending upon the conditions (e.g., temperature and pressure) and choice of process gas, reactive plasma is formed that suits the particular process being performed in the chamber. In an etching process, material is removed from the substrate surface, while a depositing process will deposit material on the substrate surface.

Unfortunately, plasma processing also removes and deposits material on the plasma process kit parts inside the plasma chamber. Once too much material accumulates on a process kit part, it may flake off and circulate within the chamber, eventually contaminating substrate surfaces and vital chamber components. Further, parts subjected to chamber processing or part cleaning techniques may become eroded or worn. Because process kit parts must remain within exacting size tolerances, excessive deposits and wear can impact process performance within the chamber.

To guard against such problems, process kit parts must be cleaned or replaced. However, cleaning causes additional wear and replacement can be costly. Further, both result in down-time for personnel and equipment. In order to minimize wafer production costs, cleaning or replacement of a process kit part should be done only when the part is unable to function properly in the process chamber. Thus, process kit part dimensions are frequently measured, not only to ensure compliance with strict tolerances, but to avoid premature cleaning and replacement.

Conventionally, measurement metrology techniques, such as measuring the part with precision calipers or some other general purpose measuring tool, are utilized. However, such techniques typically require disconnecting and removing process kit parts from their plasma chambers, which can be labor intensive, and often results in down-time for personnel and plasma processing tools. Moreover, use of general purpose measuring tools to test a process kit part requires accurate reading of the tool as well as knowledge of the desired dimension for the particular process kit part being measured. These requirements can lead to false indications of the status of a part.

An alternative method of determining the status of a part is by manufacturing the process kit part with a mark such as an etch or scribe mark, the visibility of which aids in determining whether a process kit part is within tolerance. For example, a mark may be formed by scribing a symbol to a particular scribe depth in the part. When the part is subject to processing and cleaning, one can determine whether the part has eroded beyond the scribe depth by simply verifying whether the symbol is visible or not. However, this method requires a specially manufactured part and is not useful for determining material accumulation on a part. Moreover, as process kit parts may have different tolerances for different processes performed in the chamber, the scribe depth must be specific to the chamber process that the part will be exposed to. This may result in an otherwise generic process part becoming process specific.

SUMMARY OF THE INVENTION

Accordingly, one object of the present invention is to address the above described and/or other problems in the art of semiconductor processing kit parts.

Another object of the present invention is to provide an improved system for verifying whether a dimension of a process kit part feature violates a prescribed size tolerance.

Yet another object of the present invention is to provide an improved go no-go gauge for verifying whether a process kit part used within a plasma chamber of a plasma processing tool has accumulated excessive wear or deposits.

These and other objects of the present invention may be provided by a go no-go gauge for verifying whether a process kit part used within a plasma chamber of a plasma processing tool has accumulated excessive wear or deposits. The go no-go gauge includes a main body configured to be grasped by a user of the go no-go gauge, and a verifying feature configured to verify whether a dimension of a feature of the process kit part violates a prescribed size tolerance, wherein a violation of the prescribed tolerance indicates excessive wear of the process kit part or excessive material deposits on the process kit part. Also included is an identification feature configured to uniquely associate the go no-go gauge with at least one of the process kit part and a process to which the process will be exposed.

Another aspect of the invention includes a method for verifying whether a process kit part used within a plasma chamber of a plasma processing tool has accumulated excessive wear or deposits. The method includes determining a go no-go gauge associated with the process kit part, the go no-go gauge having a verification feature configured to verify whether a dimension of a process kit part feature violates a prescribed size tolerance, wherein a violation indicates the process kit part has accumulated excessive deposits of material or experienced excessive wear, and applying the verification feature to the process kit part in a prescribed manner to verify whether the violation has occurred.

Still another aspect of the invention is a go no-gauge for verifying whether a process kit part used within a plasma chamber of a plasma processing tool has accumulated excessive wear or deposits. The go no-gauge includes a means for verifying whether a dimension of a feature of the process kit part violates a prescribed size tolerance, wherein a violation of the prescribed tolerance indicates excessive wear of the process kit part or excessive material deposits on the process kit part, and means for uniquely associating the go no-go gauge with at least one of the process kit part, a feature of the process kit part, and a process to which the process kit part will be exposed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
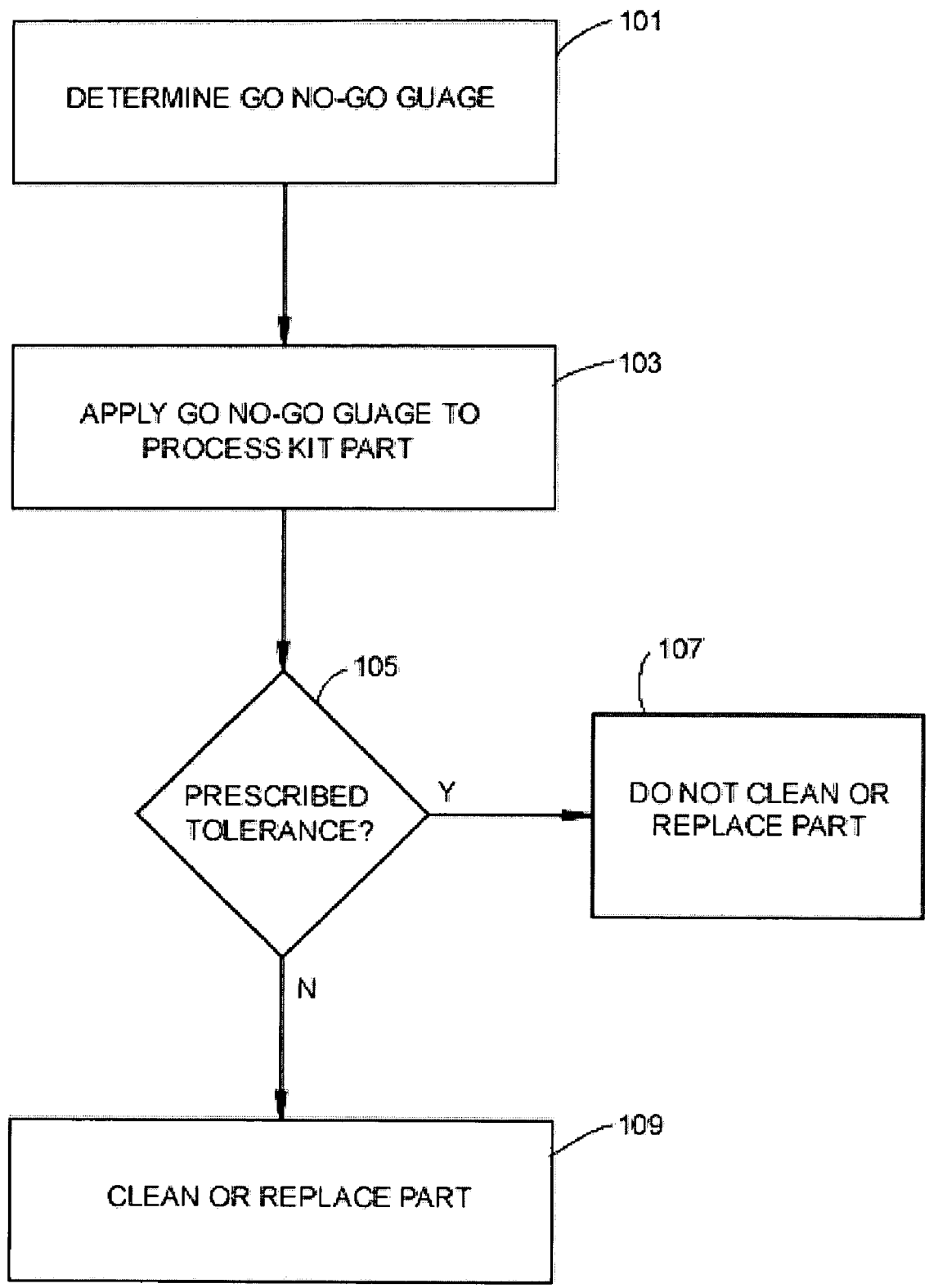
FIG. 1 illustrates a process flow chart showing steps for determining whether a process kit part has accumulated excessive wear or deposits.

Referring now to the drawings, wherein like reference numerals designate identical or corresponding parts throughout the several views, FIG. 1 is a process flow chart showing a method for determining whether a process kit part used within a plasma chamber of a plasma processing tool has accumulated excessive wear or deposits. As seen in this figure, the process begins in step 101 with determining a go no-go gauge appropriate for measuring a desired feature of a process kit part. As a semiconductor processing chamber includes many process kit parts and each part may have more than one feature to be measured, an appropriate go no-go gauge must be chosen to measure a desired characteristic. In addition, because process kit parts may have different tolerances for different processes performed in the chamber, the go no-go gauge may have to be specific to a process performed in the chamber.

In one embodiment, determination of the go no-go gauge is based on an identification feature provided on the go no-go gauge itself. The identification feature may relate to at least one of the process kit part to be measured, a feature of the process kit part to be measured, and a chamber process to which the process kit part will be exposed. The identification feature will be further discussed below with respect to FIG. 2.

In an alternative embodiment of the invention, determination of the go no-go gauge in step 101 is performed based on information other than an identification feature provided on the go no-go gauge itself. For example, experience of a maintenance person checking the process kit part may be drawn on to associate a particular go no-go gauge with the process kit part and the feature to be measured. Alternatively, written instructions separate from the go no-go gauge may be provided to a maintenance person for reference.

Once the appropriate go no-go gauge is determined in step 101, a user of the go no-go gauge applies the gauge to the process kit part, as seen in step 103. Application of the go no-go gauge to the process kit part involves the user applying a verification feature of the go no-go gauge to a feature of the process kit part. For example, where the feature of the process kit part is a hole that must have a minimum diameter, the go no-go gauge may include a protrusion having a diameter equal or slightly less than the minimum diameter. In this example, application of the go no-go gauge would be the user's attempt to fit the protrusion into the hole in the process kit part. Other examples of applying the go no-go gauge to a process kit part will become clear from the discussion of FIGS. 2–6 below.

In a preferred embodiment of the present invention, application of the go no-go gauge to the process kit part in step 103 occurs while the process kit part is still mounted within the processing chamber. Specifically, the small size of the go no-go gauge and the ease of use allow the go no-go gauge to be applied to accessible features of a mounted process kit part. This feature of the present invention provides significant advantages over prior art methods that use general purpose metrology tools, which generally require time consuming removal of the process kit part from the process chamber. In alternative embodiments, the go no-go gauge may be applied to the process kit part when the process kit part is removed from the process chamber. This embodiment still provides advantages over the use of general purpose metrology tools because the go no-go gauge can be quickly applied to the feature of the process kit part and an accurate determination of whether the process kit part is in or out of tolerance can be made more quickly than with a general purpose metrology tool.

Once the go no-go gauge is applied to the process kit part in step 103, a determination is made in step 105 as to whether a prescribed tolerance of the process kit part is met. Returning to the example provided above, where the minimum diameter protrusion of the go no-go gauge fits within the hole in the process kit part, the go no-go gauge provides an indication that the hole in process kit part is not less than a minimum diameter and therefore meets the prescribed tolerance. However, if the minimum dimension protrusion of the go no-go gauge does not fit within the hole in the process kit part, then the go no-go gauge provides an indication that the hole in the process kit part is less than the minimum diameter and therefore does not meet the prescribed tolerance. This may occur, for example, where material accumulates on the process kit part to close the diameter of the hole in the process kit part.

Where a determination is made in step 105 that the prescribed tolerance of the process kit part feature is met, then the maintenance person does not clean or replace the process kit part as indicated by step 107, or has the option to clean or replace the process kit part if desired. However, where step 105 indicates that the process kit part feature is not within the prescribed tolerance, the process kit part is cleaned or replaced as shown in step 109. Cleaning of the process kit part may occur where the process kit part has excessive accumulation of material thereon. Replacement of the process kit part may occur where there is an excessive accumulation of material on the part and the part cannot be cleaned, or the process kit part has been eroded to a thickness of some other dimension that is outside the tolerance of the process kit part feature.

Thus, the method according to the present invention provides a simple and efficient method for verifying an excessive accumulation of material deposited on a process kit part or excessive erosion or wear of a process kit part. Such a method provides reduced maintenance and replacement costs, reduced personnel and equipment down time, as well as improved part performance and reduced IC substrate and chamber component contamination.

Figure 2:
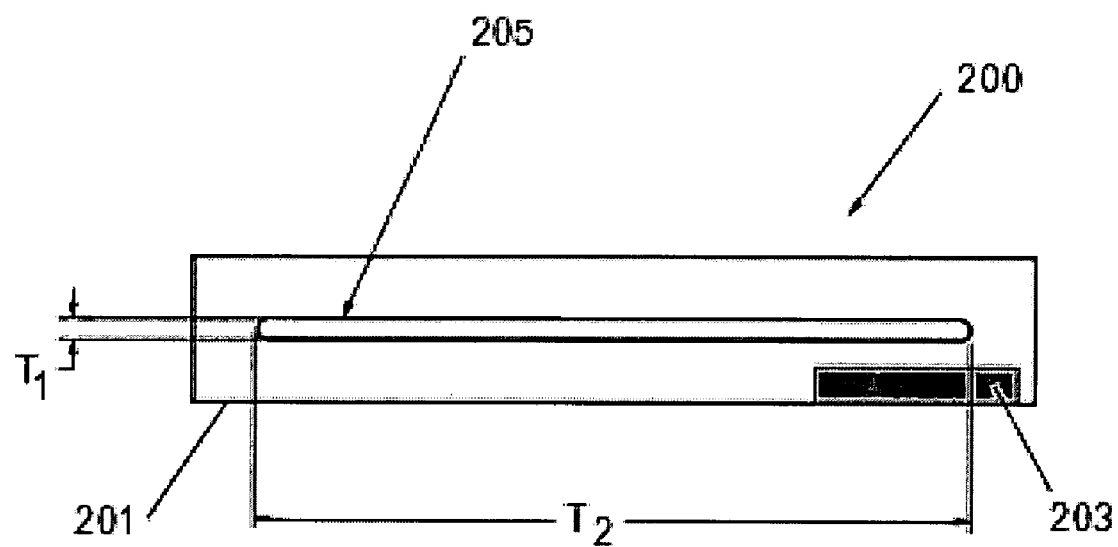
FIG. 2 illustrates a go no-go gauge with identification and open slot verification features.

FIG. 2 shows an exemplary go no-go gauge 200 used for determining whether a process kit part (not shown) meets a prescribed tolerance in accordance with an embodiment of the present invention. As seen in this Figure, the go no-go gauge 200 includes a main body 201, an identification feature 203, and a verification feature 205.

The main body 201 is sized and shaped to facilitate a user grasping and utilizing the go no-go gauge 200. In this regard, the main body 201 is preferably sized large enough to accommodate the identification feature 203 and the verification feature 205, but small enough that the go no-go gauge 200 may be used on a process kit part mounted within the process chamber.

The go no-go gauge 200 is preferably made of a material suitable for inexpensive mass production of the go no-go gauge 200, and for easy disposal of the gauge 200 when necessary. Thus, the main body 201 (and the go no-go gauge in general) is preferably manufactured from at least one of Teflon, plastic, metal, or a composite material. However, other suitable materials may be used.

As also seen in FIG. 2, the embodiment of this figure includes an identification feature schematically shown as feature 203. The identification feature 203 is preferably a symbol, color, word, or other marking that identifies the gauge 200 as associated with at least one of a process kit part, a feature of a process kit part, and a process to which a process kit part may be exposed. As described above, a semiconductor processing apparatus may include several process kit parts, each requiring a unique go no-go gauge in accordance with the present invention to determine whether the process kit part is within a prescribed tolerance. Further, each process kit part may include several features that require different go no-go gauges to determine whether the particular feature of the process kit part is within a prescribed tolerance. Finally, a process kit part may have different prescribed tolerances associated with different processes to which the process kit part will be exposed, thereby requiring different go no-go gauges for the process kit part. The identification feature 203 preferably associates the particular go no-go gauge with any one of these characteristics of the process kit part. It is noted, however, that the identification feature 203 is not necessary when the verification feature 205 is configured so as to be unique to a plasma process kit part or process kit part feature. Where the verification feature 205 is unique, the verification feature itself may provide the identification feature because the verification feature can be readily associated with the appropriate process kit part to be measured.

The verification feature 205 is a slot-like opening of width T1 and length T2. This particular verification feature 205 can perform at least two functions. Namely, if a process kit part feature cannot traverse the opening 205, and the feature is properly oriented with respect to the opening 205, then one can verify that a particular dimension of the part exceeds the width or length of the opening 205. For example, when the slot 205 is sized to measure or verify a condition where the process kit part has material deposited on the part over time, the part will slide through the slot 205 as long as it has not grown dimensionally to a point where it will not work in the process, or a point where deposition on the part risks particle generation. Conversely, if the feature can traverse the opening 205, and the feature is similarly oriented, then one can verify that the particular dimension is smaller than the width and length of the opening 205. For instance, where the slot 205 is sized to measure or verify a condition where the process kit part is eroded over time, the part will not pass through the slot until its condition is small enough to reject the part for use. Of course, where the dimensions T1 and T2 are associated with a critical dimension of a process kit part, verification indicates whether the part needs to be cleaned or replaced as described with respect to FIG. 1 above.

Figure 3A:
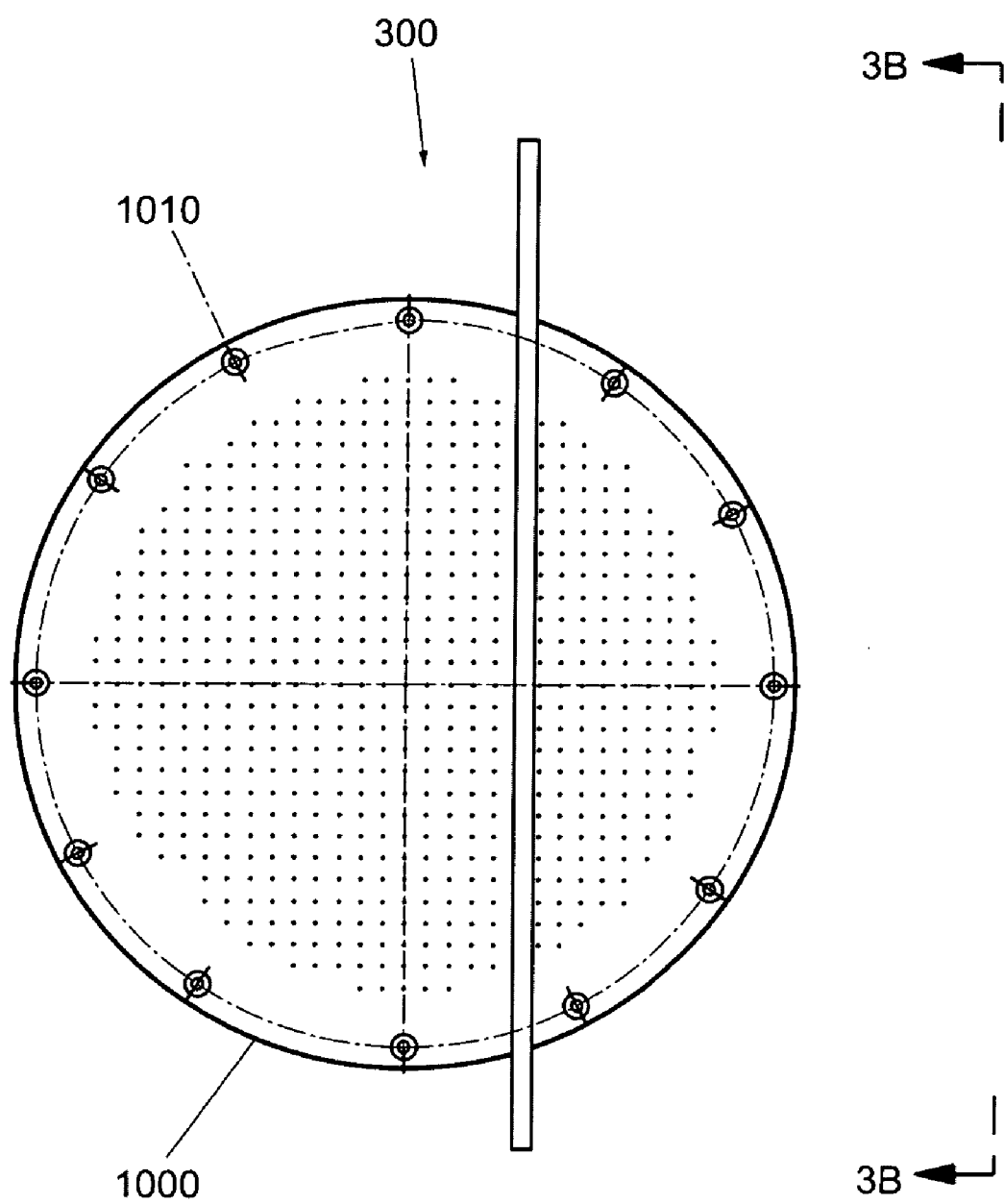
FIGS. 3A and 3B illustrate the go no-go gauge of FIG. 2 in relation to a process kit part, with the process kit part shown in frontal and side views, respectively.
Figure 3B:
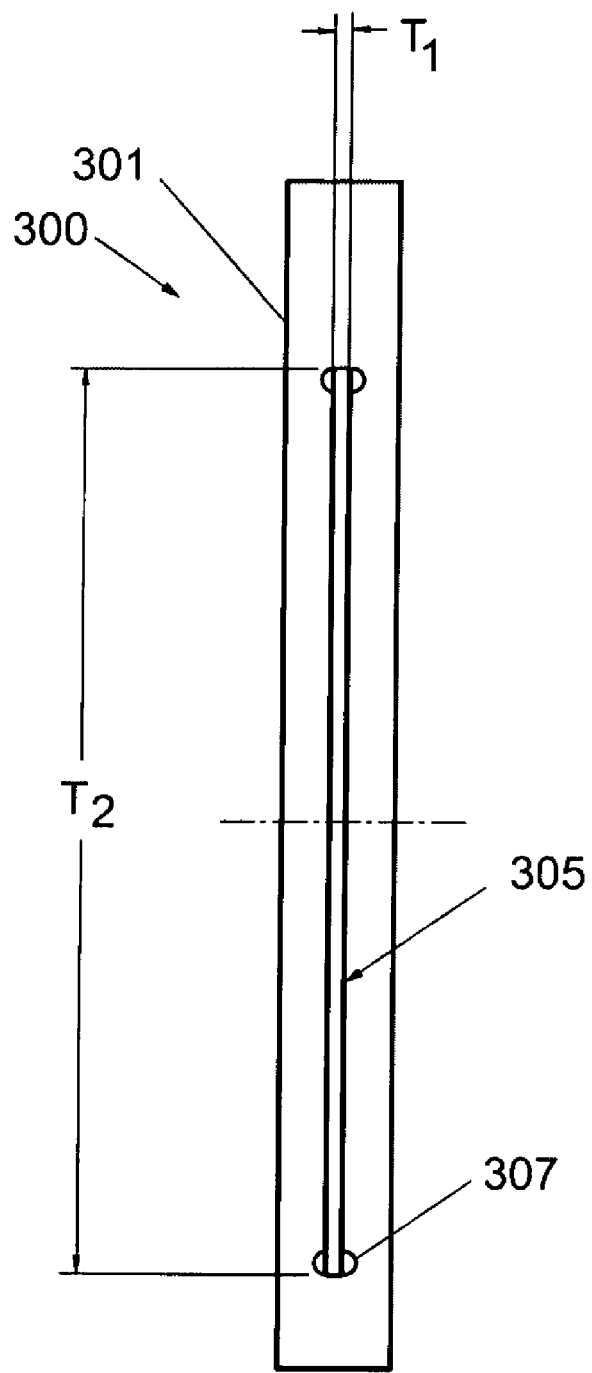

FIGS. 3A and 3B show a go no-go gauge 300 in relation to a process kit part 1000 in accordance with an embodiment of the invention. As seen in FIGS. 3A and 3B, the go no-go gauge 300 includes a main body 301, a verification feature 305, and clearance features 307. The verification feature 305 is sized to detect whether the injection plate 1000 is in or out of a prescribed tolerance by passing the gauge 300 over the injection plate 1000 as shown in FIG. 3A. Clearance features 307 in the gauge 300 ensure that the gauge 300 can slide over a protrusion 1010 in the injection plate 1000.

With respect to FIG. 3A, presume the part 1000 has dimensions of width (T1−1 μm) and diameter T2. An unaltered part 1000 is small enough to traverse the opening 305. However, if one face of the part accumulates a deposit layer more than 1 μm thick, the part 1000 can no longer traverse the opening 305, because its width now exceeds T1. Thus, in this instance, the opening is used to verify an excessive accumulation of deposits.

With respect to FIG. 3B, presume the part 1000 has dimensions of width (T1+1 μm) and diameter T2. An unaltered part 1000 is too large to traverse the opening 305, because its width exceeds T1. However, if one face of the part 1000 is evenly worn by more than a depth of 1 μm, the part 1000 can now pass through the opening 305. Thus, in this instance, the opening 305 is used to verify an excessive accumulation of wear.

While the embodiment of FIGS. 2 and 3 show go no-go gauges having a closed slot verification feature in accordance with the present invention, it is to be understood that the present invention is not limited to such structure. For example, the present invention could employ an open slot and/or a variety of pins, holes and tabs; or any other measuring feature to verify whether a dimension of an opening exceeds a prescribed tolerance. Moreover, while the verification feature of FIGS. 2 and 3 provide a relatively simple and generic slot-like feature, as indicated above, the verification feature of the go no-go gauge may be a specific configuration that is matable in a "lock and key" type fashion with a feature of a process kit part to be measured using the go no-go gauge. Thus, the verification feature can serve as the identification feature.

Figure 3C:
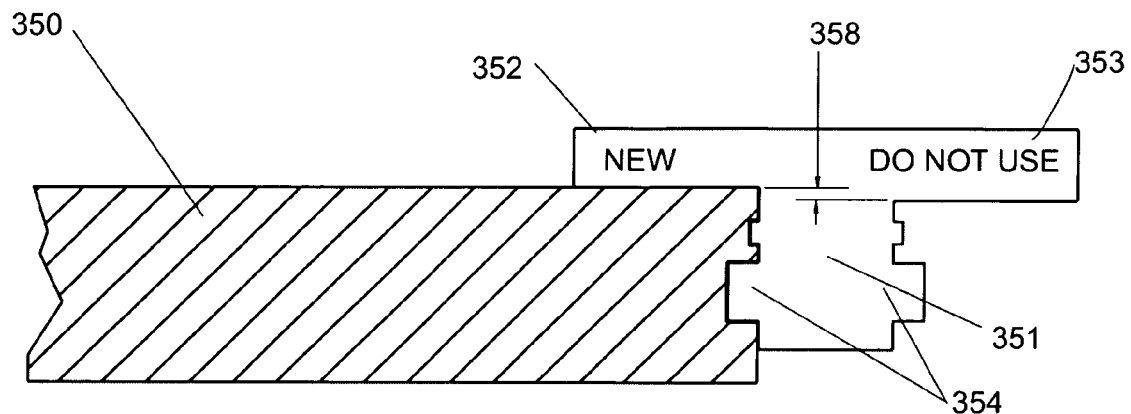
FIGS. 3C and 3D illustrate a go no-go gauge in relation to a consumable process kit part having matable lock and key features, before and after erosion of a face of the consumable part has occurred, respectively.
Figure 3D:
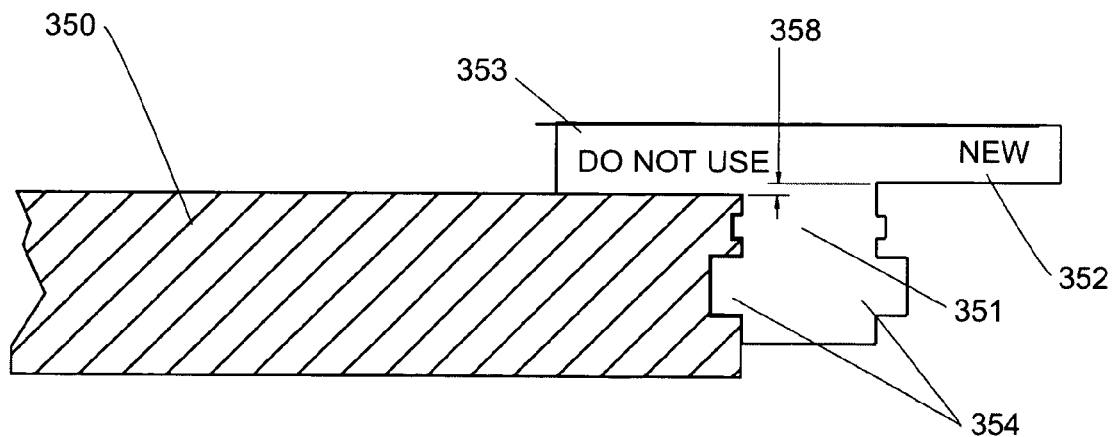

For example, FIGS. 3C and 3D identify a consumable part 350 that utilizes a go no-go gauge 351 with matable lock and key features 354. In FIG. 3C, the consumable part 350 is contained in a system where a plasma process occurs that tends to erode the upper surface 357 of the consumable part 350. If the consumable part 350 is new, or newly replaced, only the "new" feature 352 of the go no-go gauge 351 can slip over the upper surface 357 of the consumable part 350 when the key features 354 and consumable part 350 are engaged. As the plasma process continues over time, the consumable part 350 erodes until it is deemed out of the prescribed tolerance 358 as shown in FIG. 3D. If the "do not use" feature 353 of the go no-go gauge 351 can slip over the upper surface 357 of the consumable part 350 when the key features 354 and consumable part 350 are engaged, then the part is ready for replacement.

Figure 3E:
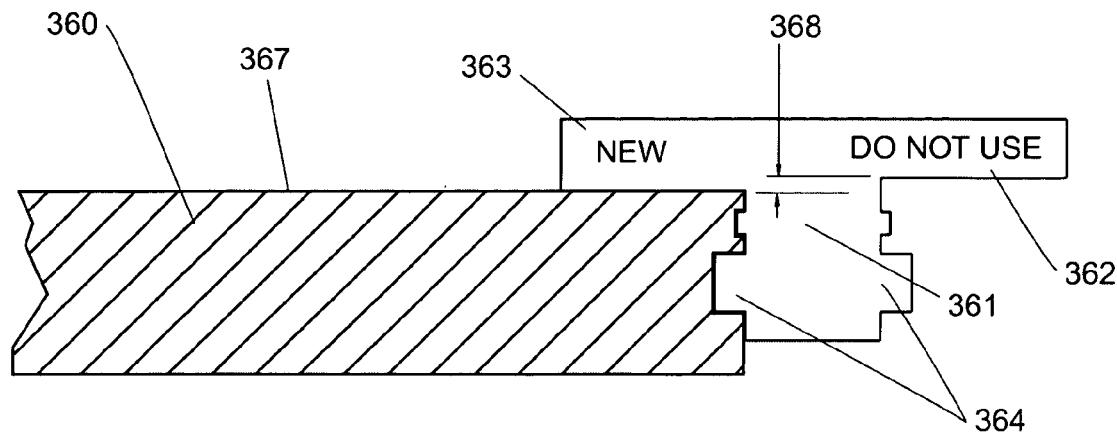
FIGS. 3E and 3F illustrate the go no-go gauge and consumable part of FIGS. 3C and 3D, before and after deposits have accumulated on the surface of the consumable part, respectively.
Figure 3F:
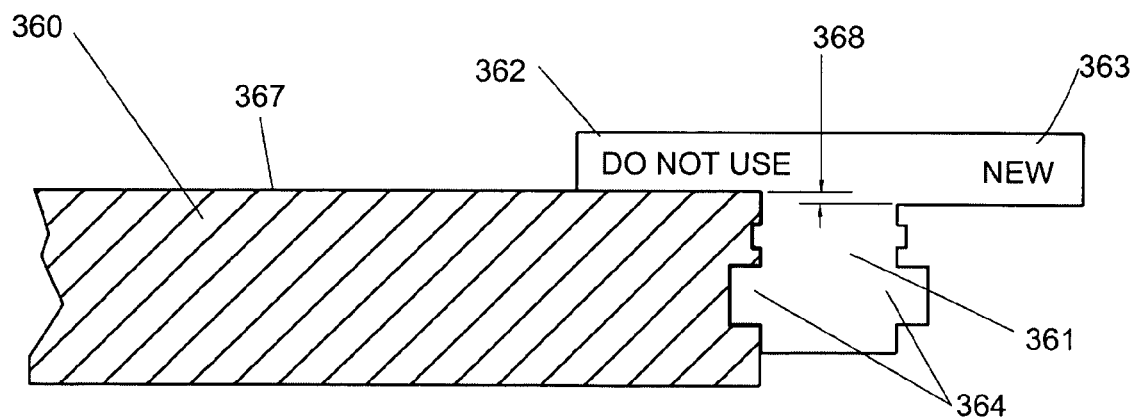

FIGS. 3E and 3F identify a consumable part 360 that utilizes a go no-go gauge 361 with matable lock and key features 364. In FIG. 3E, the consumable part 360 is contained in a system where a plasma process occurs that tends to deposit materials on the upper surface 367 of the consumable part 360. If the consumable part 360 is new, or newly replaced, the "new" feature 363 of the go no-go gauge 361 can slip over the upper surface 367 of the consumable part 360 when the key features 364 and the consumable part 360 are engaged. As material deposits on the consumable part 360 over time, the dimensions of the part 360 increase beyond the prescribed tolerance 368, as shown in FIG. 3F. At that time, the "do not use" feature 362 of the go no-go guage 361 can no longer slip over the upper surface 367 of the consumable part 360, when the key features 364 and consumable part 360 are engaged, signaling that the part 360 is ready for replacement or cleaning.

Figure 4:
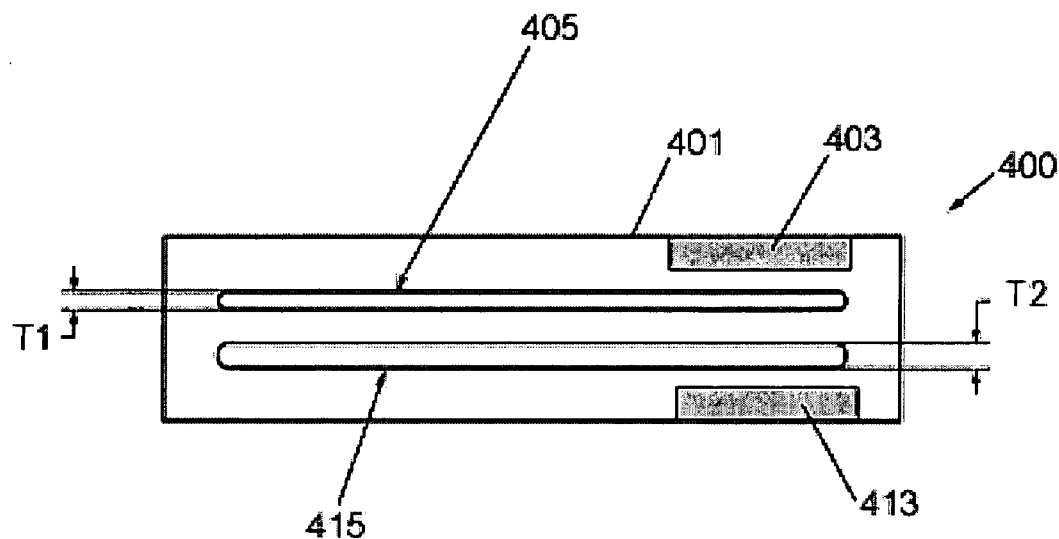
FIG. 4 illustrates a go no-go gauge having two verification features.

In addition, while the go no-go gauge of FIGS. 2 and 3 shows a single verification feature on the go no-go gauge, it is to be understood that multiple verification features can be used on the same go no-go gauge. For example, FIG. 4 shows a go no-go gauge 400 having a main body 401 and two verification features 405 and 415. As seen in FIG. 4, the verification features 405 and 415 can have different dimensions T1 and T2, respectively. These different dimensions may allow for use of the go no-go gauge 400 to verify the status of different process kit parts, the same process kit part having different features, or the same process kit part having different prescribed tolerances based on a process to which the process kit part 400 is exposed. As also seen in FIG. 4, the go no-go gauge 400 may include identification features 403 and 413 that identify at least one of a process kit part, process kit part feature, and process to which the process kit part is exposed, for each of the verification features 405 and 415.

Figure 5:
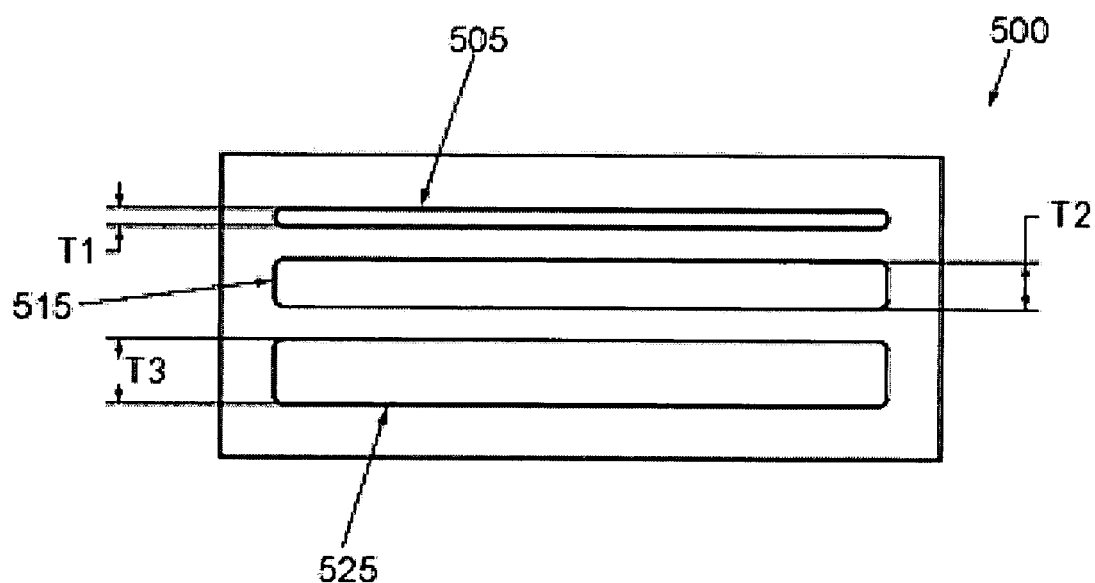
FIG. 5 illustrates a go no-go gauge having three verification features.

FIG. 5 shows a go no-go gauge 500 having three verification features 505, 515, and 525. As seen in this figure, the verification features include different dimensions T1, T2, and T3, respectively. While not shown in FIG. 5, identification features associated with each verification feature may also be included in the go no-go gauge 500.

Figure 6A:
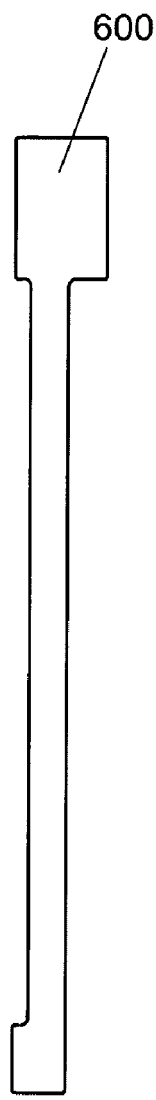
FIGS. 6A and 6B illustrate a go no-go gauge for verifying a process kit part mounted to a surface of a plasma process chamber.
Figure 6B:
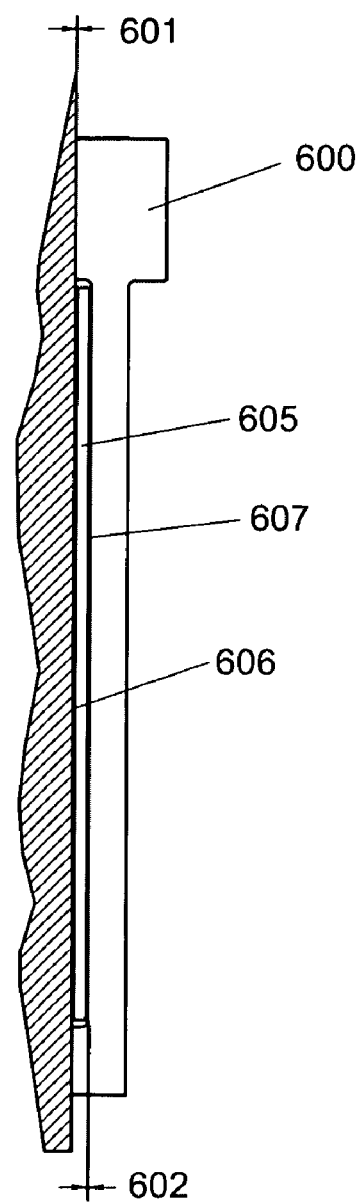

While the embodiments described with respect to FIGS. 2–5 are applicable to verifying a dimension of a process kit part that has been removed from a plasma process chamber, the present invention is not limited to this application. FIGS. 6A and 6B show an example of a go no-go gauge 600 used to measure or verify a process kit part 605 that is attached to a mounting surface 606 in the plasma process chamber.

In a case where the plasma process tends to erode the face surface 607 of the consumable part 605, the go no-go gauge 600 is configured such that a gap 601 exists between the go-no-go gauge 600 and the mounting surface 606, when a new consumable part and the go no-go gauge are mated. As the consumable part 605 erodes over time, the gap 601 decreases until it disappears entirely, and another gap 602 begins to form between the surface of the consumable part 607 and the go no-go gauge 600. The presence of the gap 602 and the absence of a gap 601 (i.e. contact between the gauge 600 and the mounting surface 601) indicates that replacement of the consumable part 605 is necessary.

In a case where the plasma process tends to deposit material on the face surface 607 of the consumable part 605, the go no-go gauge 600 is configured such that the gap 602 will exist between the consumable part 605 and the go no-go gauge 600, when the go no-go gauge 600 ends contact the mounting surface 606. As deposits form on the consumable part 605 over time, the gap 602 will disappear, signaling it is time to replace or clean the consumable part 605.

Figure 7B:
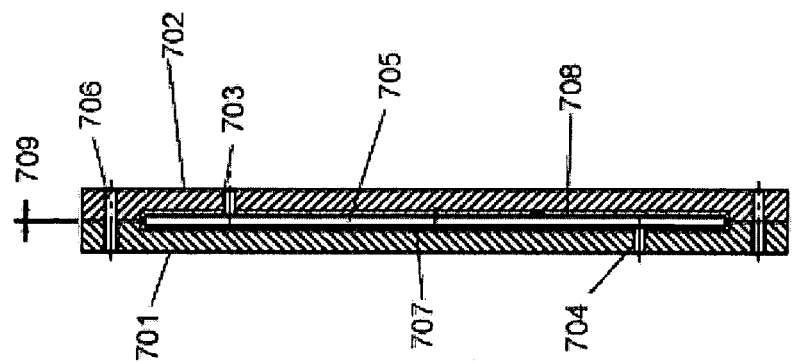
FIGS. 7A and 7B illustrate a go no-go gauge formed of upper and lower plates for verifying the thickness of a consumable part.
Figure 7A:
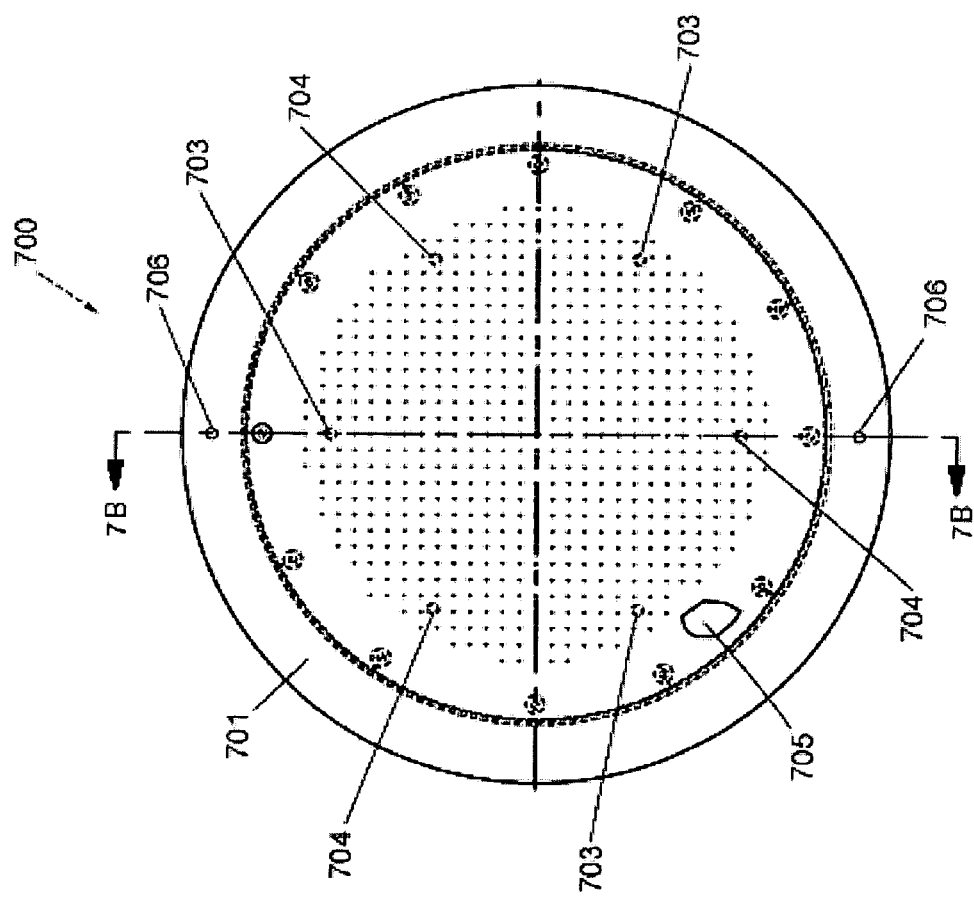

Another embodiment of the present invention, described with respect to FIGS. 7A and 7B, provides for verifying a dimension of a process kit part 705 that has been removed from a plasma process chamber. A go no-go gauge 700 is formed from an upper plate 701 and a lower plate 702. The upper plate 701 contains three dowel pins 704, or other features, forming a datum plane. In a like manner the lower plate 702 contains three dowel pins, or other features, forming another datum plane. The upper plate 701 and the lower plate 702 are mated together with some number of dowel pins 706.

When verification of the thickness of the consumable part 705 is required, the consumable part 705 is installed between the upper plate 701 and the lower plate 702 of the verification tool 700. The dowel pins 704 contact the consumable part 705 in three places on side 707 of the consumable part 705; dowel pins 703 contact the consumable part 705 in three places on side 708 of the consumable part 705. In a case where the consumable part 705 erodes over time, the go no-go gauge 700 can be configured such that a gap 709 exists when the part 705 is inserted in the gauge 700. As the consumable part 705 erodes, the gap 709 becomes smaller and smaller. When the consumable part 705 finally erodes beyond prescribed tolerances, the gap 709 disappears to signal that the consumable part 705 is ready for replacement as shown in FIG. 7B.

In a case where the consumable part 705 accumulates deposits over time, the verification tool 700 can be configured such that the consumable part 705 will fit within the gauge 700 without creating a gap 709. When the consumable part 705 accumulates too much depositing, a gap 709 appears to signal that the part 705 is ready for cleaning or replacement.

Figure 8A:
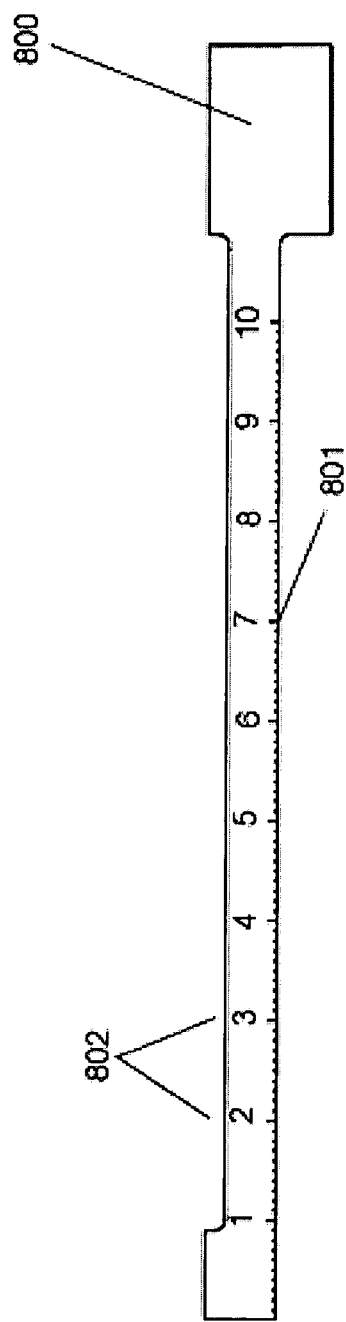
FIGS. 8A and 8B illustrate a go no-go gauge having a tool for performing functions other than the verification of process kit part features.
Figure 8B:
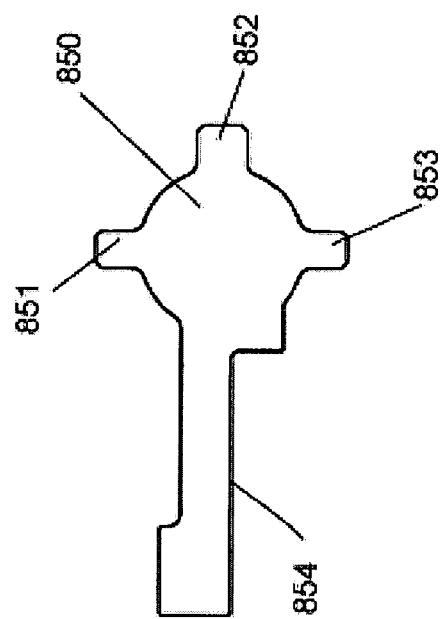

FIGS. 8A and 8B show go no-go gauges having a tool for performing a simple function other than verifying a feature of a process kit part. FIG. 8A, for example, shows a go no-go gauge 800 having a scale with associated markings 802 placed close to surface 801 of the gauge 800. FIG. 8B shows a gauge 850 having screwdriver blades 851, 852 and 853. The tools of these go no-go gauges 800 and 850 may be specifically adapted for use with the plasma process kit parts for which the gauges 800 and 850 were designed to verify.

Obviously, numerous modifications and variations of the present invention are possible in light of the above teachings. It is therefore to be understood that within the scope of the appended claims, the invention may be practiced otherwise than as specifically described herein.

The invention claimed is:

1. A go no-go gauge for verifying whether a plasma process chamber kit part used within a plasma chamber of a plasma processing tool has accumulated excessive wear or deposits, comprising:
    a main body configured to be grasped by a user of the go no-go gauge;
    a verifying feature configured to verify whether a dimension of a feature of the process kit part violates a prescribed size tolerance, wherein a violation of the prescribed tolerance indicates excessive wear of the process kit part or excessive material deposits on the process kit part; and
    an identification feature configured to uniquely associate the go no-go gauge with at least one of said plasma process chamber kit part and a process to which the plasma chamber kit part will be exposed.

2. The go no-go gauge of claim 1, wherein the main body comprises at least one of Teflon, plastic, metal, and a composite material.

3. The go no-go gauge of claim 1, further comprising a company identification mark visibly provided on a surface of the go no-go gauge.

4. The go no-go gauge of claim 1, further comprising a tool configured to perform a simple function other than said verifying whether a dimension of a feature of the process kit part violates a prescribed size tolerance.

5. The go no-go gauge of claim 4, wherein said tool comprises at least one of a screwdriver, a measuring scale and a letter opener.

6. The go no-go gauge of claim 1, wherein said verifying feature comprises a plurality of verifying features each configured to verify whether a dimension of a feature of the chamber kit part violates a prescribed size tolerance.

7. The go no-go of claim 1, wherein the verifying feature comprises a protrusion for verifying that the dimension exceeds the prescribed size tolerance.

8. The go no-go of claim 1, wherein the verifying feature comprises a protrusion for verifying that the dimension is smaller than the prescribed size tolerance.

9. The go no-go of claim 1, wherein the verifying feature comprises a cavity for verifying that the dimension exceeds the prescribed size tolerance.

10. The go no-go of claim 1, wherein the verifying feature comprises a cavity for verifying that the dimension is smaller than the prescribed size tolerance.

11. The go no-go gauge of claim 1, wherein the identification feature comprises a unique configuration of said verification feature that is specific to said chamber kit part.

12. The go no-go gauge of claim 1, wherein the identification feature comprises a unique marking that specifies at least one of said chamber kit part, a feature of the chamber kit part and a process to which the chamber kit part will be exposed.

13. The go no-go gauge of claim 12, wherein said unique marking comprises at least one of a color and a symbol associated with said at least one of said chamber kit part, said feature of the chamber kit part and said process.

14. A method for verifying whether a process kit part used within a plasma chamber of a plasma processing tool has accumulated excessive wear or deposits, comprising:
determining a go no-go gauge associated with said process kit part, the go no-go gauge having a verification feature configured to verify whether a dimension of a process kit part feature violates a prescribed size tolerance, wherein a violation indicates the process kit part has accumulated excessive deposits of material or experienced excessive wear; and
applying the verification feature to the process kit part in a prescribed manner to verify whether the violation has occurred.

15. The method of claim 14, wherein said determining comprises determining a go no-go gauge associated with said process kit part based on an identification feature provided on said go no-go gauge.

16. The method of claim 15, wherein said determining comprises determining a go no-go gauge associated with the process kit part based on at least one of a symbol, a color, and a word provided on said go no-go gauge.

17. The method of claim 14, wherein said determining comprises determining a go no-go gauge associated with said process kit part based on information not provided on said go no-go gauge.

18. The method of claim 14, wherein said applying comprises applying the verification feature to the process kit part while the process kit part is mounted within a semiconductor processing chamber.

19. The method of claim 14, wherein said applying comprises applying said verifying feature to the process kit part after said process kit part is removed from a semiconductor processing chamber.

20. The method of claim 14, further comprising determining whether to clean or replace said process kit part based on said applying step.

21. The method of claim 14, further comprising using said go no-go gauge to perform a simple function other than said verifying function.

22. The method of claim 21, wherein said simple function is at least one of screwing a screw and measuring a dimension other than said dimension of a feature of the process kit part.

23. The method of claim 14, wherein said applying comprises verifying that a dimension of the process kit part is smaller than a prescribed size tolerance.

24. The method of claim 14, wherein said verifying comprises verifying that a dimension of the process kit part exceeds the prescribed size tolerance.

25. A go no-gauge for verifying whether a plasma process chamber kit part used within a plasma chamber of a plasma processing tool has accumulated excessive wear or deposits, comprising:
a means for verifying whether a dimension of a feature of the process kit part violates a prescribed size tolerance, wherein a violation of the prescribed tolerance indicates excessive wear of the process kit part or excessive material deposits on the process kit part; and
means for uniquely associating the go no-go gauge with at least one of said plasma process chamber kit part, a feature of said plasma process chamber kit part, and a process to which the plasma chamber kit part will be exposed.

* * * * *